United States Patent [19]
Wetzel

[11] 3,739,271
[45] June 12, 1973

[54] MIRRORED METER SCALE AND METHOD OF MANUFACTURE

[75] Inventor: Percy A. Wetzel, Florham Park, N.J.

[73] Assignee: Weston Instruments, Inc., Newark, N.J.

[22] Filed: July 26, 1971

[21] Appl. No.: 165,918

[52] U.S. Cl. .................. 324/76 R, 117/35, 350/113
[51] Int. Cl. ........................... G01r 1/08, G02b 5/08
[58] Field of Search ..................... 324/76, 151, 156; 350/113; 117/35

[56] References Cited
UNITED STATES PATENTS
1,595,727  8/1926  Pierce ............................. 350/113 X
1,640,520  8/1927  Scherr ............................. 350/113 X
3,235,395  2/1966  Scharf ............................. 117/3.1 X Primary Examiner—Alfred E. Smith
Attorney—Walter Kruger, William R. Sherman and Jerry M. Presson

[57] ABSTRACT

A meter scale of translucent plastic material and having indicia and a mirror thereon to avoid inaccurate readings due to parallax. The mirror is of a predetermined configuration and takes the form of a very thin film of reflective material bonded to a surface of the meter scale. The meter scale is made by printing indicia on a surface and heat transferring the very thin film mirror to a surface of the scale.

7 Claims, 9 Drawing Figures

PATENTED JUN 12 1973 3,739,271
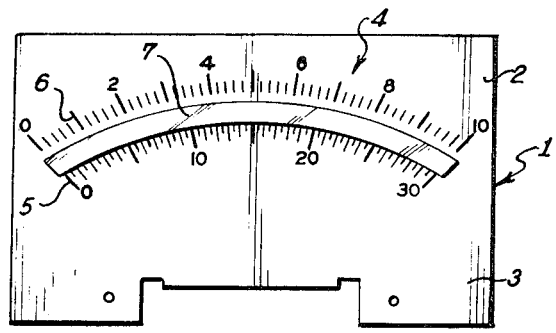
FIG. 1
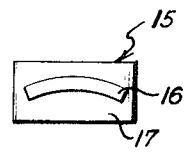
FIG. 7
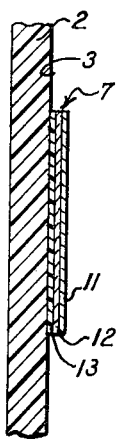 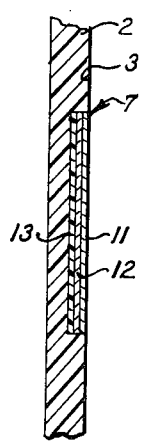 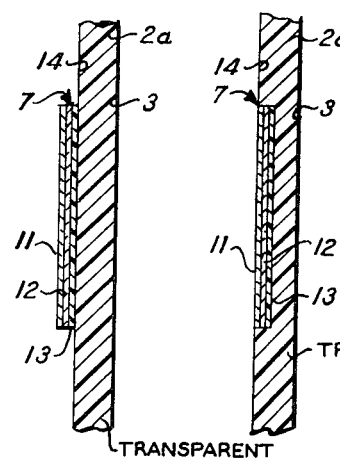 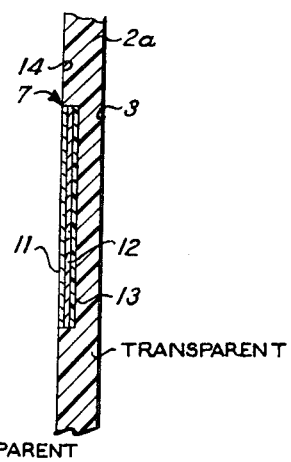
FIG. 2    FIG. 3    FIG. 4    FIG. 5
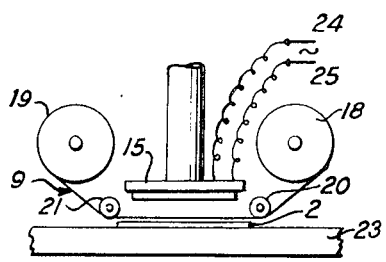 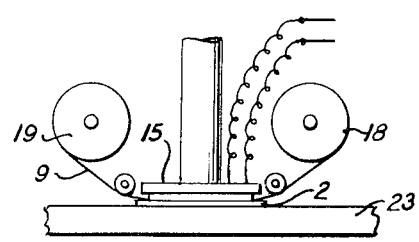
FIG. 8    FIG. 9
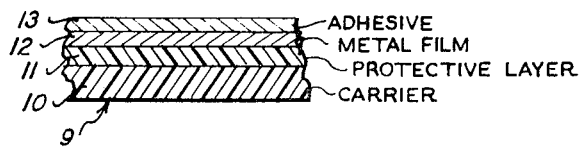
FIG. 6
INVENTOR
PERCY A. WETZEL
BY
Walter Kruger
ATTORNEY

MIRRORED METER SCALE AND METHOD OF MANUFACTURE

This invention relates to a durable inexpensive scale for use with measuring instruments, for example, electric meters of the moving coil type. In accordance with the invention a mirror in the form of a very thin film of highly reflective material is provided on the scale to avoid erroneous readings due to parallax. The invention also relates to a method of making the meter scale by applying the thin film to a surface of the scale by a heat transfer process.

It is well known in the patented art to use a mirror in conjunction with a meter scale to avoid inaccurate readings as a result of viewing the pointer along a line of sight which is not precisely perpendicular to the face of the scale. By providing a mirror parallel to the scale face the user of the meter can position his eye so he sees no reflected image of the pointer in the mirror, whereupon, the line of sight is precisely perpendicular to the mirro and to the scale face.

In the past, such meter scales including a mirror were quite expensive since the mirror frequently took the form of a highly polished meter plate which was usually placed behind the meter scale and the scale had either a slot through which the mirror was visible or the mirror was larger than the scale so it was visible above the top of the scale. In meters of reasonably good accuracy, for example, 2 percent accuracy based on full scale deflection, the scale must be of a dimensionally stable material which does not expand or contract markedly as a result of temperature and humidity changes. Because of this requirement, the prior art meter scales were formed from a thin metal plate and the mirror was customarily a highly polished chrome plated copper or brass plate positioned behind the thin metal scale.

In accordance with this invention, the expensive meter scale constructions used in the past are completely avoided. Instead, the meter scale is formed from a sheet of plastic material having good dimensional stability, and the mirror to avoid parallax error is advantageously applied directly to the front fact of the scale. The mirror is a very thin film of a highly reflective material, such as aluminum, which is bonded directly to a surface of the scale by impressing a heating dye on the rear surface of a transfer tape so a mirror the the desired configuration is bonded to a face of the scale. As a result of this technique of applying the mirror, a meter scale is provided which is quate inexpensive, yet is very durable and suitable for use with even very expensive meter movements of extreme accuracy on the order of 1 percent.

Correspondingly, an object of this invention is a meter scale in which a thin film mirror of predetermined configuration is provided on a surface of the scale to avoid parallax errors.

Another object is a meter scale of a dimensionally stable plastic material having indicia and a thin film mirror on a front surface of the scale.

A further object is a method of making a meter scale in which a heat activateable transfer tape is superimposed on the scale and a heating head of predetermined configuration is pressed against the tape to transfer and bond a mirror of predetermined configuration on the surface of the scale.

An additional object is a meter scale having a mirror of predetermined configuration on a surface thereof, the mirror taking the form of a laminate only several thousandths of an inch thick and including a metal layer having a transparent protective coating thereon.

Numerous other objects, advantages, and features of the invention will become apparent with reference to the accompanying drawings which form a part of this specification and in which:

FIG. 1 is a plan view of the meter scale in accordance with this invention;

FIG. 2 is a partial enlarged view in section taken along line 2—2 of FIG. 1 showing a first embodiment of the meter scale construction;

FIG. 3 is a view corresponding to FIG. 2 and showing a second embodiment of the meter scale construction;

FIG. 4 is a view corresponding to FIG. 2 and showing a third embodiment of the meter scale construction;

FIG. 5 is a view corresponding to FIG. 2 and showing a fourth embodiment of the meter scale construction;

FIG. 6 is an enlarged view in section of the transfer tape from which the thin film mirror is applied to the meter scale;

FIG. 7 is a reduced size bottom plan view of a heated pressing head for transferring the mirror film;

FIG. 8 is a schematic view in front elevation showing a meter scale in position beneath the transfer tape just before applying the film mirror; and FIG. 9 is a view corresponding to FIG. 8 and showing a heated head pressed against the tape to transfer reflective film mirror to the scale.

Referring now to the drawings in detail and particularly to FIG. 1 there is shown a meter scale 1 according to this invention which takes the form of a generally flat rectangular sheet or plate 2 of a transparent or transluscent material of uniform thickness. Formed on the sheet and visible from its front face 3 are indicia 4 including graduations and numerals. In the embodiment of the scale shown at FIG. 1 there is a lower set of graduations 5 and an upper set of graduations 6, each with corresponding numberals. Between the upper and lower rows of graduations is a mirror 7 which takes the form of a narrow arcuately curving band which extends slightly beyond each end of the indicia 5 and 6. A mirror 7 of this configuration and location allows the user of a meter equipped with the scale 1 to position his eye so his line of sight to the meter is precisely perpendicular to the front face of the scale and which position is attained when the observer sees no reflected image of the pointer in the mirror 7. Correspondingly, erroneous readings due to parallax are avoided.

The mirror 7 is formed on sheet 2 by transferring a highly reflective material from a transfer tape 9 having a metal coating thereon. A suitable transfer tape is the one disclosed in U.S. Pat. No. 3,235,395, issued Feb. 15, 1966. For convenience, FIG. 1 of that patent is reproduced in this application as FIG. 6. As shown, the tape 9 includes a carrier or backing sheet 10 with a release layer 11 thereon and forming a protective surface for a metal film 12 deposited thereon. A heat activated adhesive layer 13 is coated on the metal film. The several sheets and layers 10-13 are advantageously of substantially uniform thickness and the total thickness of the tape is on the order of 0.005–0.010 inches. As explained in the above mentioned patent, the carrier can be a sheet of MYLAR having a thickness on the order of 0.002 inches and the metal film itself may be on the order of 1/50,000 inches thick. When the tape is placed with its adhesive layer 13 against sheet or plate 2 and a heated tool is pressed against the back of carrier sheet 10, a reflective film of the shape of the tool is transferred to the scale. The transferred film includes the bond adhesive layer 13, the metal layer 12, and the protective layer 11.

The scale of this invention can take several forms. In the embodiment of FIG. 2 the scale sheet 2 takes the form of a sheet of high impact polystyrene (a thermoplastic material) 1/32 inch or less thick. The thin film mirror 7 of this embodiment is applied to the front face 3 by a heat transfer process. Where only a very low pressure is used during the transfer the mirror projects slightly from this front surface. However, since the thickness of the several layers of material comprising the thin film mirror 7 including the adhesive 13, metal layer 12, and protective layer 11, are only several thousandths of an inch thick, the mirror in no way interferes with the movement of a pointer of, for example, a moving coil type meter, since the pointer is usually 1/16 to 1/8 inch in front of the scale.

With reference to FIG. 3, sheet 2 again takes the form of a sheet of high impact polystyrene which is transluscent to provide for rear lighting of the meter scale if desired. However, the thin film mirror 7 is embedded in the front surface 3 of the sheet. This is accomplished by applying sufficient pressure with a heated tool to cause the material of sheet 2 to deform slightly so the thin film mirror 7 is embedded in the sheet and has its front surface 14 flush with the front surface 3 of the sheet and indicia 5 and 6.

In the embodiment of FIG. 4 the scale sheet 2a is formed from an optically clear material such as molded polystyrene. Where the sheet 2a is optically transparent the indicia 5 and 6 can be printed either on the front or rear surface of the sheet, the front surface being preferred. In addition, the thin film mirror 7 is advantageously applied to the rear surface 14 of the sheet. In this embodiment the adhesive layer 13 is optically clear.

With reference to FIG. 5 there is shown a variation of the construction of FIG. 3 wherein the optically clear sheet 2a has indicia printed either on its front or rear face and the thin film mirror 7 is applied with sufficient heat and pressure to embed the mirror in the rear surface 14 of the sheet.

With all the constructions of FIGS. 2–5 the protective layer 11 is of course transferred with the adhesive layer 13 and the metal layer 12 so the metal layer is not subject to damage and the finished scale can be handled without danger of removing or defacing the highly reflective metal layer.

It is to be appreciated that the embodiments shown at FIGS. 2–5 each have the thin film mirror 7 shown with the thickness of its layers 11–13 out of scale and vastly thicker than they actually are relative to the thickness of the scale plates 2 and 2a. In fact, the thickness of the thin film mirror 7 is only about 0.004 inches thick, and even in the embodiments of FIGS. 2 and 4, the projection of the mirror from the surface of the scale plate is imperceptible to the naked eye. The thin film mirror 7 can just be detected by running a finger nail across the surface of the scale. In the embodiments of the scale of FIGS. 2 and 3, the indicia 5 and 6 are applied to the front face 3 of the scale by printing. In this regard, it has been found that high impact polystyrene, the material of the sheet 2, has a surface which readily receives printing.

With regard to the embodiments of FIGS. 4 and 5, indicia 5 and 6 can be applied to either the front surface 3 or the rear surface 14 of the sheet 2a. For applying the indicia to the optically clear polystyrene sheet 2a, a heated embossing head can be used to impress the indicia in the surface of the sheet since the smooth surface of clear polystyrene does not always accept printing in the usual manner.

One surface of transfer tape 9 is completely coated with the transfer film. Transfer of the film mirror 7 in a desired configuration from the transfer tape 9 to a face of the scale is accomplished by using a heated pressing head 15 as shown at FIG. 7. The pressing head 15 has an arcuately curved portion 16 projecting from base 17, which is identical in size and configuration to the configuration of the film mirror 7. Correspondingly, when the pressing head is pressed against the rear surface of the carrier 10, the head heats the carrier and the film, presses the tape against the scale plate and transfers the mirror film onto a face of the scale.

FIGS. 8 and 9 show the manner in which heat transfer of the mirror film 7 is accomplished. A roll 18 of the transfer tape is mounted at one side of the heated pressing head 15 and a spool 19 onto which the used tape is mounted at the other side of the head. Guide rollers 20 and 21 are provided to hold the tape in close proximity to the scale plate 2 which rests on a flat supporting surface 23. Tape 9 is fed from spool 18 with its adhesive layer 13 facing scale plate 2. Head 15 is suitably heated by an electric heater (not shown) contained within the head and which is energized from a suitable source of electricity via the wires 24 and 25. The transfer is accomplished by depressing protecting portion 16 of head 15 against the tape as shown at FIG. 9. It has been found that the transfer of the thin reflective film occurs quite rapidly and requires only about one second where the head is heated to 300°Farenheit and is pressed against the back of the transfer tape with a pressure on the order of 50 psi. With the head at 350° Farenheit and pressure of 50 psi, the transferred thin film has its front face substantially co-planar with the face of the scale plate as shown in the embodiment of FIGS. 3 and 5. At this temperature and pressure the heat from the pressing head softens the material of the scale plate so the thin film mirror 7 is embedded in the plate.

At lower pressures, for example, 10 psi, with the heating head at a temperature of 300°F., pressing the transfer tape against scale plate 2 (or 2a) for only about one second results in a thin film on the surface of the scale plate as shown at FIGS. 2 or 4. Even with such lower pressure, it is almost impossible to detect the mirror film 7 even when ones fingernail is moved across the edge of the film adhered to the scale plate.

By virtue of the protective layer 11, the scale plate can be handled without danger of damaging or defacing the thin film mirror 7. The protective layer 11 is of course sufficiently durable that the mirror film 7 can be wiped or cleaned whenever it is necessary to do so.

While several preferred embodiments of a scale according to this invention have been shown and described, and while a preferred method of making the scale has also been described in detail, it is to be understood that numerous changes and variations can be made without departing from the scope of the invention as defined herein and in the appended claims.

What is claimed is:

1. A meter scale comprising a non-metallic supporting base sheet of dimensionally stable thermoplastic material of uniform thickness having a flat front surface; indicia indicative of a condition to be measured by the meter printed directly on a surface of the sheet and visible from the front surface of the sheet; and a mirror on the sheet and having a reflective surface visible from the front surface of the sheet, the mirror comprising a very thin film of a light reflective material; and a heat activatable adhesive adhering the mirror to the sheet.

2. A meter scale according to claim 1 wherein said sheet consists of a thin translucent sheet of high impact polystyrene of uniform thickness; and said thin film of light reflective material consists of a metal film less than 0.001 inches thick embedded in the front surface of the sheet.

3. A meter scale according to claim 1 wherein said thin film has the configuration of an arcuate band and extends across a surface of said flat sheet; and said indicia extend along at least one edge of said band.

4. A meter scale comprising a support sheet consisting of a thermoplastic material sheet of uniform thickness having a flat front surface; indicia indicative of a condition to be measured carried by the front surface of the sheet, the indicia consisting of indicia printed directly on the flat front surface; a mirror imbedded in the front surface of the thermoplastic sheet adjacent the indicia and having a reflective surface exposed relative to the sheet, the mirror consisting of a very thin film of a light reflective material; and a heat activatable adhesive securing the mirror to the sheet.

5. A meter scale according to claim 4 wherein the support sheet of thermoplastic material consists of a sheet of polystyrene less than 1/16 inch thick.

6. A method of making a mirrored metered scale to enhance accurately reading the meter comprising, in combination, the steps of, forming a flat scale plate from a sheet of thermoplastic material; printing indicia indicative of the condition to be measured by the meter directly onto an uncoated front surface of the plate; positioning a transfer tape having a thin film of a highly reflective material lamina on a carrier sheet thereof directly across the front surface of the scale plate; applying heat and pressure to a reverse side of the carrier sheet to transfer and bond a portion of the reflective lamina to the front surface of the scale plate, the pressure being applied by a tool having a configuration the same as the configuration of the mirror transferred to the surface, and the heat and pressure applied being sufficient to imbed the reflective material in the sheet material of the plate so the mirror is at least flush with the front surface of the scale plate.

7. A method according to claim 6 wherein the step of forming a flat scale plate includes forming a polystyrene plate less than 1/16 inch thick.

* * * * *